US007008298B2

(12) United States Patent
Riehlein et al.

(10) Patent No.: US 7,008,298 B2
(45) Date of Patent: Mar. 7, 2006

(54) MACHINE FOR MACHINING LONG WORKPIECES PROVIDED WITH CUTTING TEETH, PARTICULARLY FOR GRINDING ENDLESS SAW BLADES

(75) Inventors: Fritz Riehlein, Schemmerhofen-Alberweiler (DE); Norbert Bailer, Schemmerhofen-Altheim (DE)

(73) Assignee: Vollmer Werks Mascheninfabrik GmbH, Biberach/Riss (DE)

( * ) Notice: Subject to any disclaimer, the term of this patent is extended or adjusted under 35 U.S.C. 154(b) by 0 days.

(21) Appl. No.: 11/002,614

(22) Filed: Dec. 2, 2004

(65) Prior Publication Data

US 2005/0130563 A1 Jun. 16, 2005

(30) Foreign Application Priority Data

Dec. 12, 2003 (DE) ................................ 103 58 323

(51) Int. Cl.
*B24B 49/00* (2006.01)

(52) U.S. Cl. ........................................ 451/11; 451/236

(58) Field of Classification Search ................. 451/11, 451/14, 15, 179, 236
See application file for complete search history.

(56) References Cited

U.S. PATENT DOCUMENTS

| | | | | |
|---|---|---|---|---|
| 3,766,688 A * | 10/1973 | Maytay | ...................... | 451/210 |
| 3,803,767 A * | 4/1974 | Kotov et al. | ................ | 451/121 |
| 4,283,886 A * | 8/1981 | Obear | ........................ | 451/213 |
| 5,044,123 A * | 9/1991 | Hoffman | ..................... | 451/180 |
| 5,857,894 A * | 1/1999 | Griesbach et al. | ............. | 451/5 |

FOREIGN PATENT DOCUMENTS

WO WO 96/37328 11/1996

* cited by examiner

*Primary Examiner*—Jacob K. Ackun, Jr.
(74) *Attorney, Agent, or Firm*—Clifford W. Browning; Woodard, Emhardt, Moriarty, McNett & Henry LLP

(57) ABSTRACT

In a machine (10) for machining long workpieces (32) provided with cutting teeth (60), particularly for grinding endless saw blades, having a machine base (40) and a machining device (12) which has a rotatably drivable tool (16), particularly a grinding wheel, for machining the workpiece (62), the machining device (12) being displaceable relative to the machine base (40) and the workpiece (32), it is provided for the machining device (12) to be mounted by means of a pivot bearing arrangement (34) which permits a pivotal movement of the machining device (12) relative to the machine base (40), which results in the tool (16) moving linearly relative to the machine base (40) and the workpiece (32).

16 Claims, 7 Drawing Sheets

Figure 1:
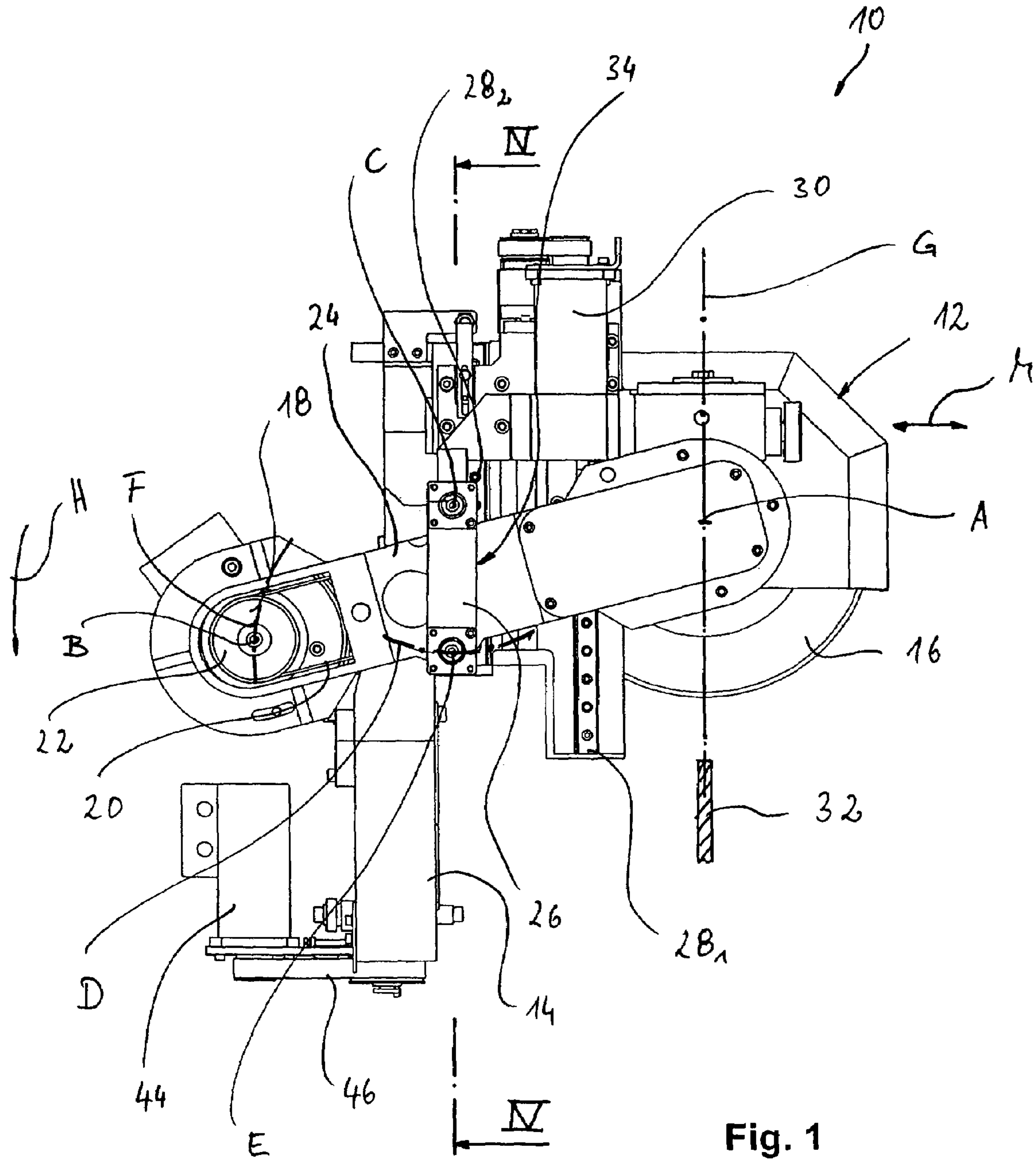

MACHINE FOR MACHINING LONG WORKPIECES PROVIDED WITH CUTTING TEETH, PARTICULARLY FOR GRINDING ENDLESS SAW BLADES

The present invention relates to a machine for machining long workpieces provided with cutting teeth, particularly for grinding endless saw blades, having a machine base and a machining device which has a rotatably drivable tool, particularly a grinding wheel, for machining the workpiece, the machining device being displaceable relative to the machine base and the workpiece.

A machine of this type is known for example from WO 96/37328. In this machine, the machining device comprises a rotatably drivable grinding wheel, the rotary drive for the grinding wheel and this latter itself being mounted on a grinding saddle which is displaceable along a linear guide. Thus, the rotatably driven grinding wheel can be moved up and down in stroke-like manner, which means between a release position, in which an endless saw blade to be machined is released from the grinding wheel with adequate clearance, and a machining position in which the grinding wheel interacts with regions of the endless saw blade which are to be machined. The device according to WO 96/37328 is, however, disadvantageous in that relatively high-mass components have to be arranged and held on the grinding saddle and moved linearly in the displacement direction. The particular problem with this is that conventional linear drives generally do not have a self-locking action so that fixing means have to be provided in order to enable the grinding saddle to be locked in a predetermined position, for example in the release position, when the machine is switched off or switched to no-load operation. This requires additional technical labour.

The prior art furthermore includes machines for machining long workpieces provided with cutting teeth, in which the stroke movement of the tool, particularly the grinding wheel, is realised in that the machining device is constructed in the style of a pendulum and is pivoted about a pivot point, the grinding wheel moving about the pivot point on a path shaped like a segment of a circle. Devices of this type are disadvantageous in that the workpiece to be machined, particularly an endless saw blade, is not machined evenly owing to the fact that the grinding wheel moves along a path shaped like a segment of a circle. Instead, as a result of the path of the tool being shaped like a segment of a circle, the tooth base or tooth back produced may slant. When the endless saw blade is later used, this results in an asymmetrical distribution of force owing to the asymmetrical geometry of the ground tooth.

The asymmetrical distribution of force which occurs at the particular saw tooth during sawing ultimately results in an undesired crooked cut, since the saw blade "saws untrue" in the material to be machined. Moreover, a tooth base which is ground at a slant can increase the risk of cracks in the blade owing to the asymmetrical distribution of force during sawing and owing to the notch effect of the grooves produced by sawing.

By contrast, the object of the present invention is to provide a machine of the type described at the outset, which, with a simple construction, enables reliable and accurately dimensioned machining of workpieces whilst substantially preventing undesired asymmetrical grinding geometries.

This object is achieved by a machine of the type described at the outset, in which the machining device is mounted by means of a pivot bearing arrangement which permits a pivotal movement of the machining device relative to the machine base, which results in the is tool moving linearly relative to the machine base and the workpiece.

According to the invention, a machine is provided in which the tool is pivoted by way of a pivot bearing arrangement. However, the pivot bearing arrangement is constructed in such a way that the tool, particularly the grinding wheel, executes a linear movement during the pivotal movement of the machining device. By realising a linear movement of the tool with respect to the machine base and the workpiece by means of a pivot bearing arrangement with which the machining device is pivoted, an even—i.e. linear—"insertion" of the tool into the workpiece to be machined can be effected on the one hand to ensure a symmetrical geometry of the cutting teeth to be machined. On the other hand, as a result of the pivotal bearing of the machining device, part of machining device can be used as a mass-balancing means according to the basic mechanical concept of a rocker in order to form a counter-weight to the part of the machining device provided with the tool, which, with a low expenditure of force at most, enables the tool to be held in a release position releasing the workpiece to be machined.

To realise the linear movement of the tool relative to the machine base and relative to the workpiece, a further development of the invention provides for the machining device to be linearly displaceable relative to the machine base along a first linear displacement axis by means of a linear drive. In terms of the construction of the linear drive, a further development of the invention provides for a linear guide, preferably a double linear guide, to be associated with the linear drive. In this connection, it can furthermore be provided for the linear drive to have a ball-and-screw spindle drive. This enables a relatively effective, particularly low-friction, linear drive.

With respect to the pivot bearing arrangement, a further development of the invention provides for this to have at least one pivot bearing plate which is pivotable about a first pivot axis relative to the machine base and on which the machining device is mounted such that it is pivotable about a second pivot axis parallel with the first pivot axis. By constructing the pivot bearing arrangement with at least one pivot plate, which provides a first pivot axis and a second pivot axis parallel with the first pivot axis, it is possible to displace that part of the machining device provided with the tool, for example with the above-mentioned linear guide, in which case the at least one pivot bearing plate pivots about the first pivot axis relative to the machine base and the machining device pivots about the second pivot axis relative to the pivot bearing plate, said second pivot axis being parallel with the first pivot axis. In other words, with a linear movement, the machining device can move linearly along the first linear displacement axis, in which case a pivotal movement is executed about the second pivot axis and an additional pivotal movement of the pivot bearing plate is executed about the first pivot axis. With respect to the position of the pivot axes, a further development of the invention provides for the first and second pivot axis to each extend substantially orthogonally to the first linear displacement axis. In order to provide a mechanically more stable arrangement with high guiding accuracy, a further development of the invention provides for the pivot bearing arrangement to have two pivot bearing plates which are arranged on both sides of the machining device.

A further development of the invention preferably provides for the machining device to have a rocker arm, on the one end region of which the rotatably drivable tool is arranged and on the other opposing end region of which a rotary drive for rotatably driving the tool is arranged. So that it is possible to ensure an effective use of space, a further development of the invention provides for the first pivot axis to extend above the rocker arm and for the second pivot axis to extend below the rocker arm.

According to the invention, the above-mentioned balancing of masses is utilised particularly in that the second pivot axis is arranged with respect to the rocker arm in such a way that the mass of the rotary drive attempts to pivot the machining device in one direction so that the tool moves away from the workpiece. In other words, the torque acting on the end region having the rotary drive is greater than the torque acting on the end region having the tool, so that, in a rest position in which no current passes through the linear drive of the machining device, the rotatably drivable tool can, with a low expenditure of force at most, be moved back easily in opposition to the resistance of the current-less linear drive into its release position in which it does not engage in the cutting teeth to be machined and releases the workpiece to be machined.

A further development of the invention provides for the rotary drive and the tool to be coupled in force-transmitting manner by way of a gear arrangement, preferably by way of a belt drive. In order to maintain an additional degree of freedom when machining the cutting teeth, a further development of the invention provides for the machine to have a bearing body which is mounted on the machine base such that it is pivotable about a third pivot axis, the machining device being mounted on the bearing body such that it is pivotable about the first and second pivot axis. It can be provided here for the third pivot axis to extend substantially orthogonally to the first and second pivot axis and substantially orthogonally to the first linear movement axis. This enables the machining device to also pivot about the third pivot axis so that it is possible to vary the machining of the cutting-tooth face of individual cutting teeth, particularly the cutting angle.

A further degree of freedom for workpiece machining is provided in a further development of the invention in that the rotatably drivable tool is displaceable along a second linear displacement axis, the second linear displacement axis extending in each case substantially orthogonally to the first linear displacement axis and the third pivot axis. By providing a movement option along the second linear displacement axis, the machine according to the invention can be set to different material thicknesses of the workpiece to be machined, particularly to different blade thicknesses of endless saw blades.

It can furthermore be provided according to the invention for the movement along the first linear displacement axis and/or along the second linear displacement axis and/or about the third pivot axis to be numerically controlled. In this connection, but also in the case of non-numerically controlled axes, an advantageous embodiment of the invention provides for the rotary drive to have a drive motor which is preferably formed by a frequency-regulated three-phase a.c. motor or an a.c. motor for stabilising the circumferential speed.

Figure 2:
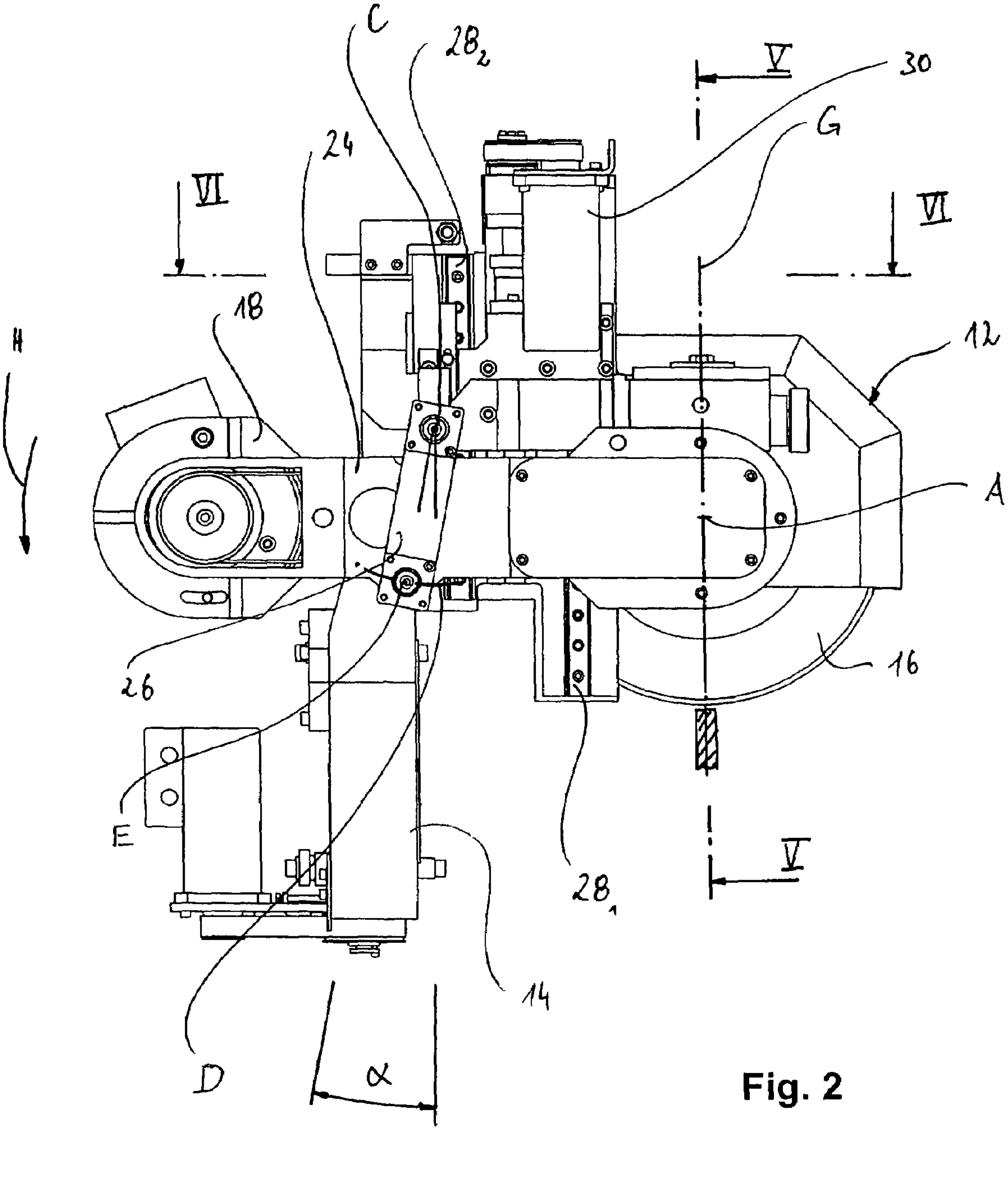
Figure 3:
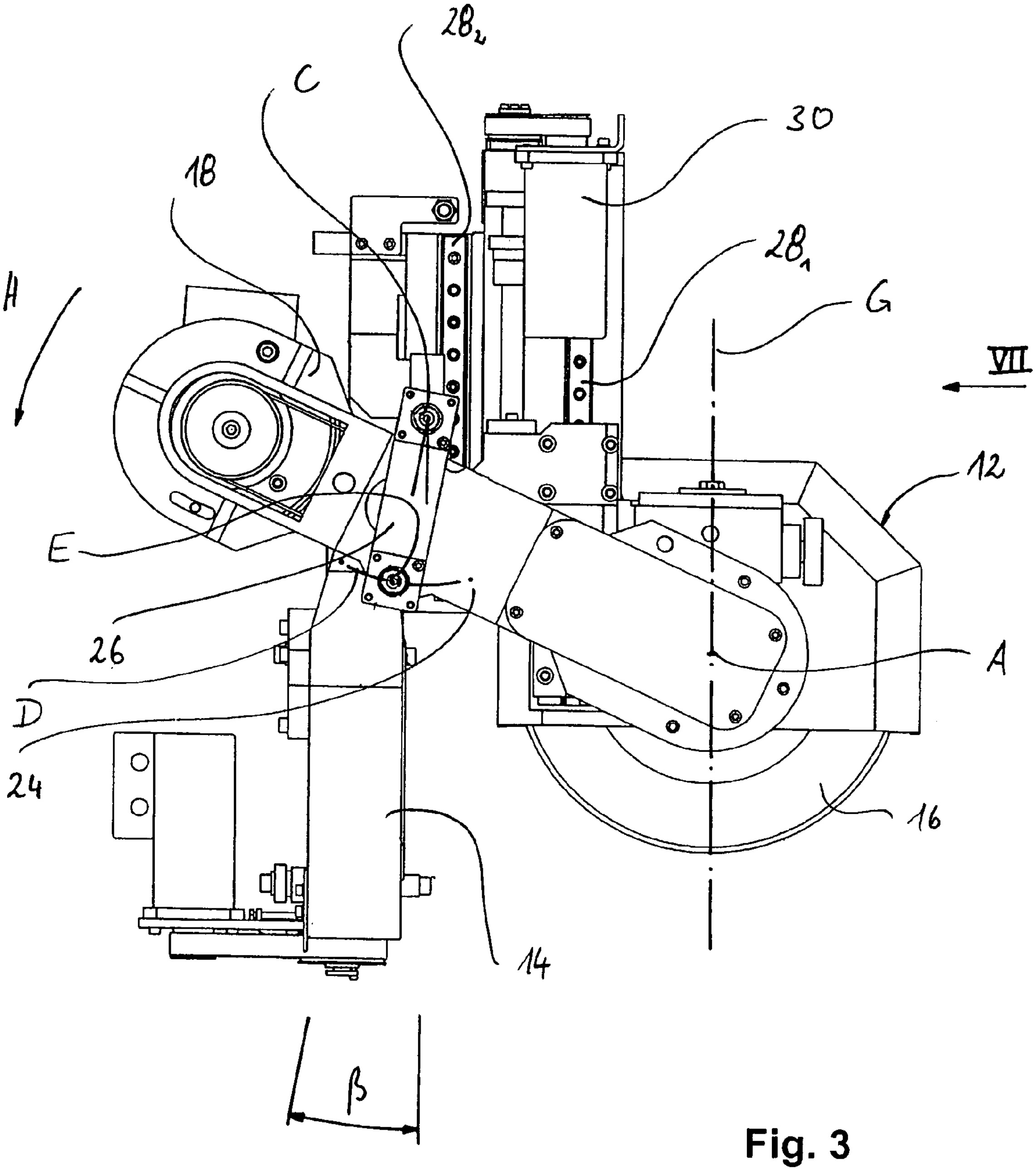
Figure 4:
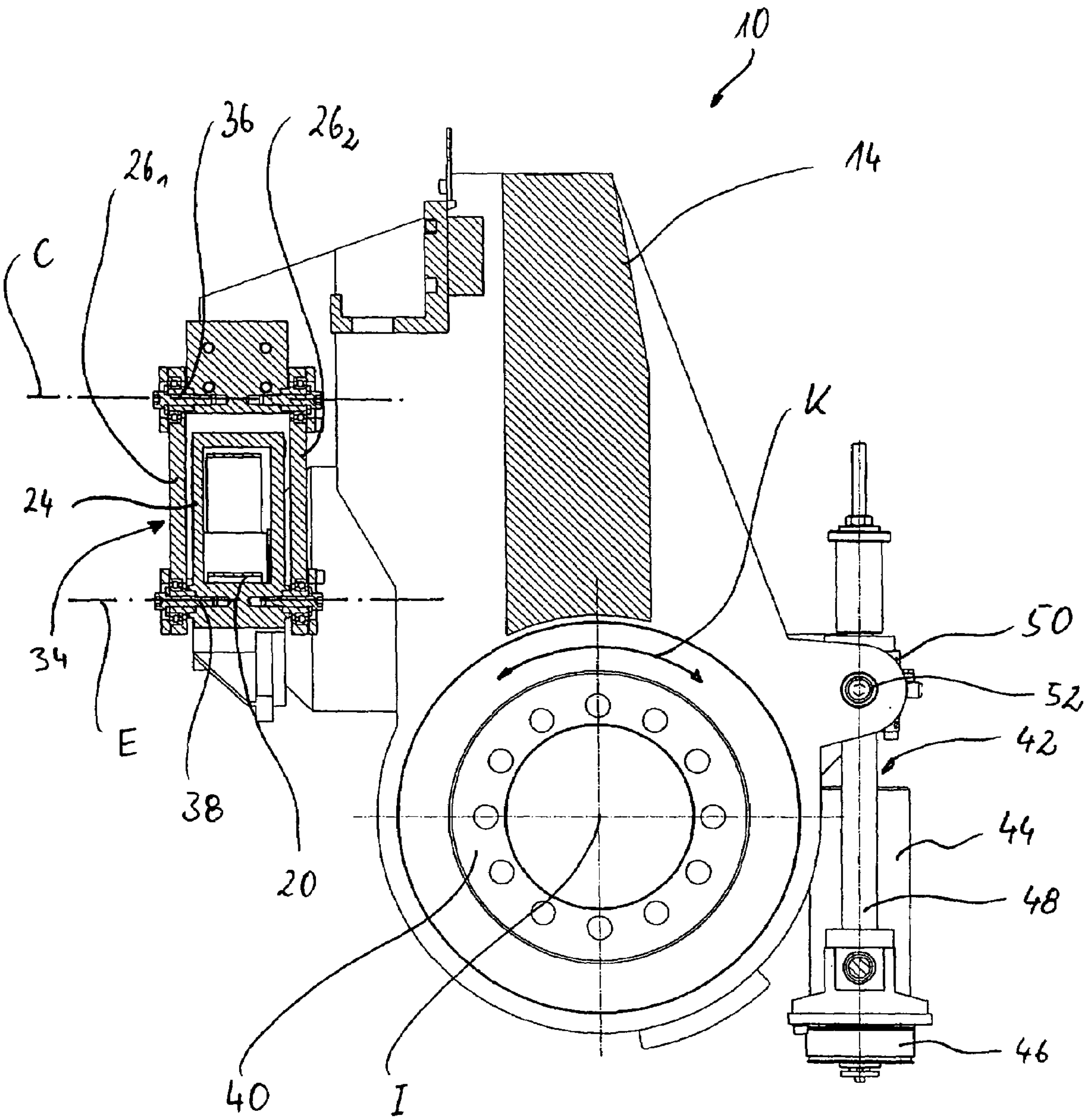
Figure 5:
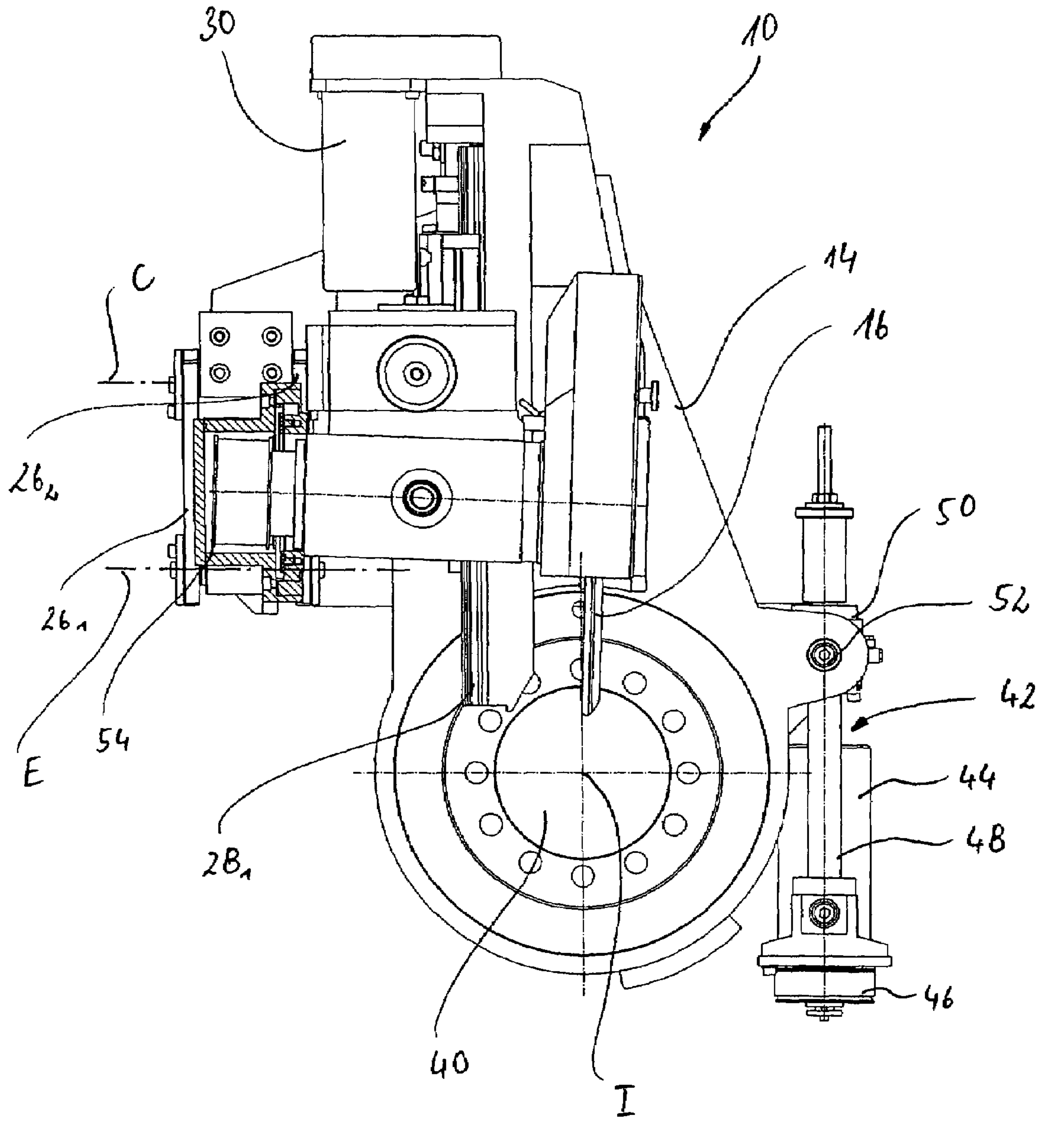
Figure 6:
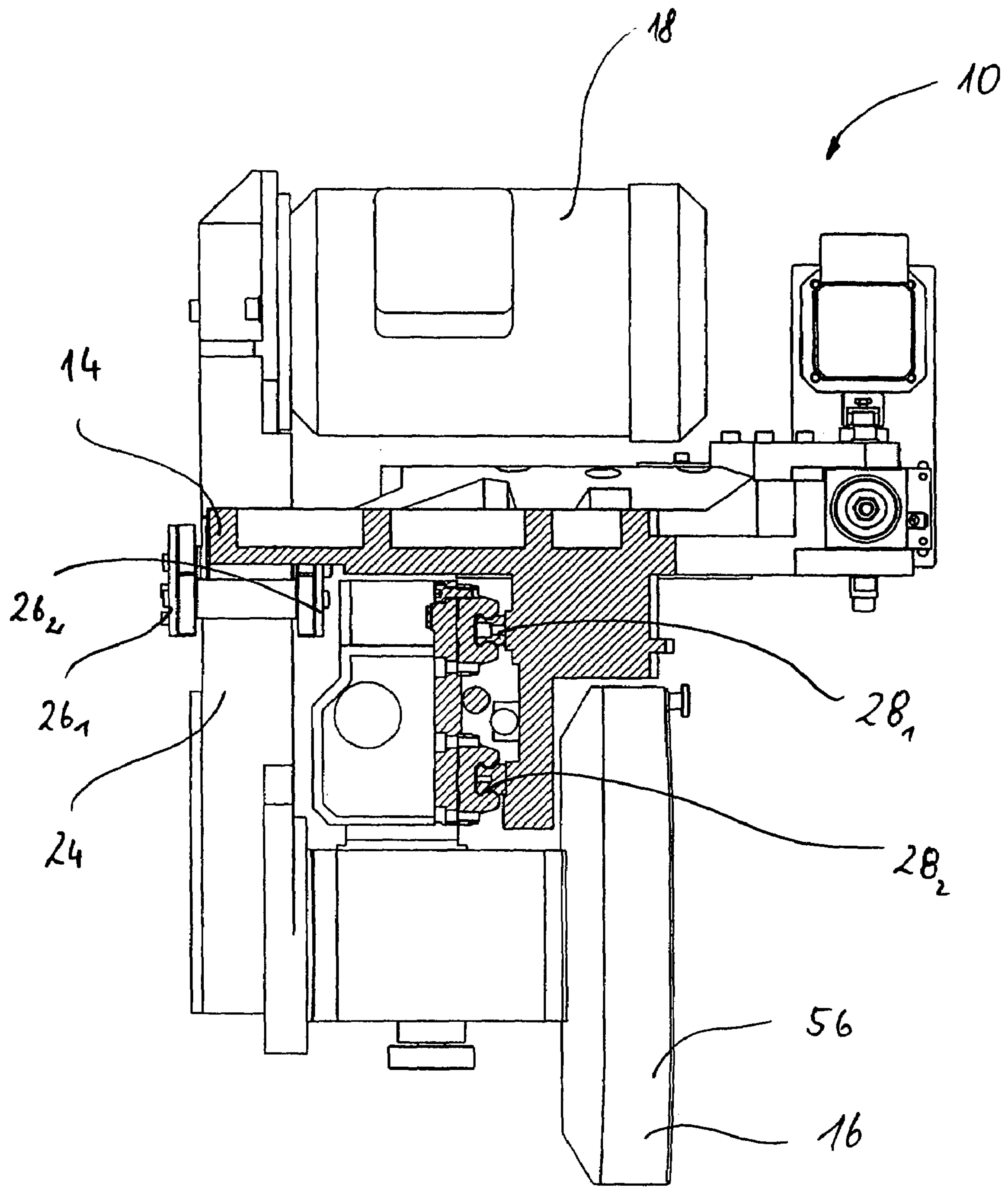

The invention is described by way of example below, with reference to the accompanying figures, which show:

FIG. 1 a front view of a machine according to the invention, with the machining device located in a release position;

FIG. 2 a view according to FIG. 1, with the machining device pivoted;

FIG. 3 a view according to FIGS. 1 and 2, with the machining device pivoted further than in FIG. 2;

FIG. 4 a view along the section line IV—IV in FIG. 1;

FIG. 5 a view along section line V—V in FIG. 2, but with only the left-hand region cut away;

FIG. 6 a view along section line VI—VI in FIG. 2; and

Figure 7:
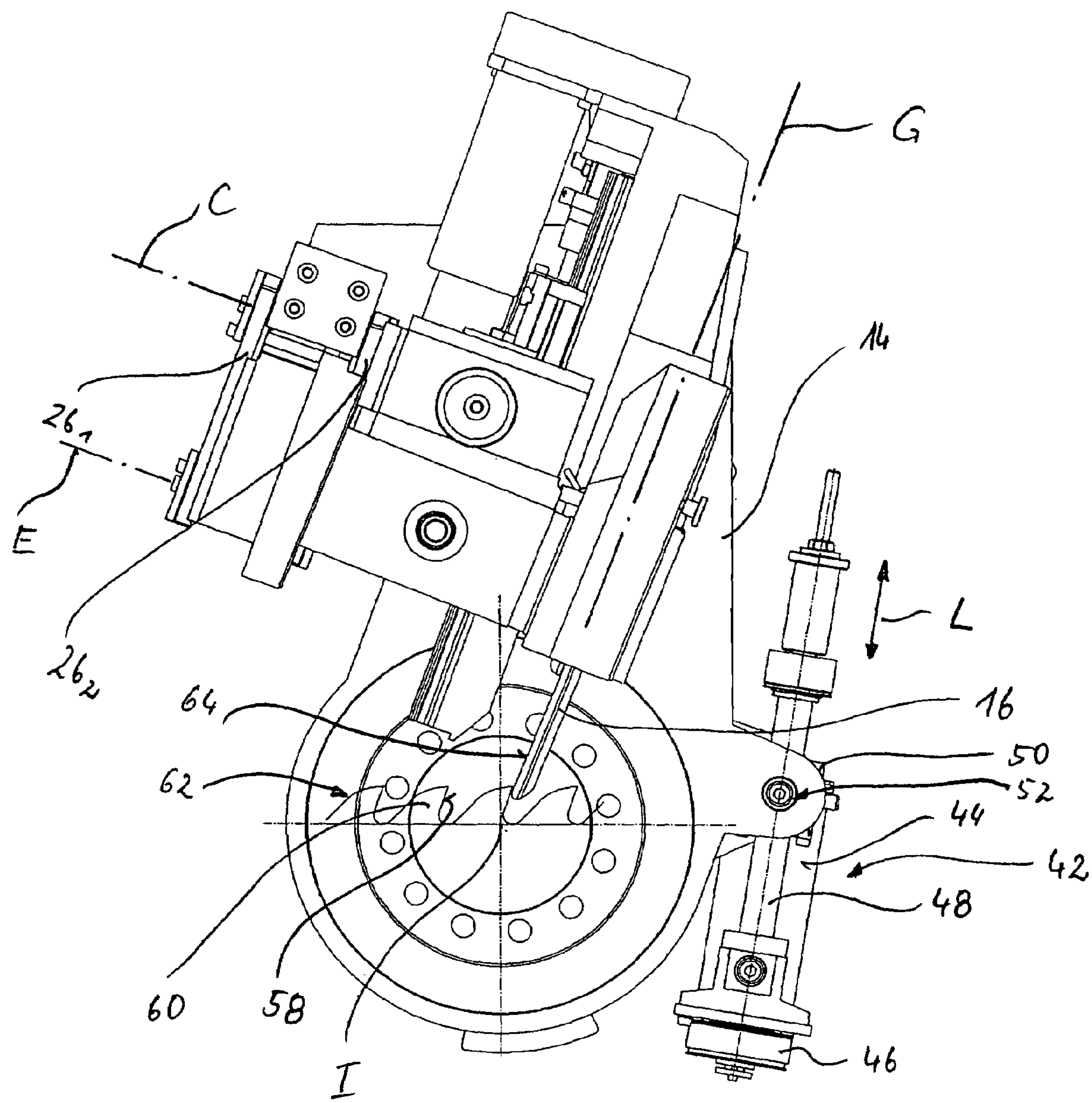

FIG. 7 a view in the viewing direction VII according to FIG. 3, but with the bearing body pivoted.

In FIGS. 1 to 3, a machine according to the invention is denoted in general by 10. The machine 10 comprises a machining device 12 mounted on a bearing body 14. The bearing body 14 is in turn mounted on a base which is not shown in FIG. 1. The machining device 12 comprises a tool constructed as a grinding wheel 16, the grinding wheel 16 being rotatably drivable about a drive axis A extending orthogonally to the plane of the drawing according to FIG. 1. The rotary driving action starts from a drive motor 18 by way of a drive belt 20, preferably a toothed belt, which is driven by way of a drive-belt pulley 22. The drive motor 18 is mounted on the left-hand end region of a rocker arm 24 (as seen in FIG. 1), whereas the rotatably drivable grinding wheel 16 is mounted on the opposing right-hand end of the rocker arm 24 (as seen in FIG. 1). The drive belt 20 extends through the hollow-constructed rocker arm 24, a drive-belt pulley (illustrated in FIG. 5 and denoted in this by 54) being rotatably mounted in the rocker arm 24 for the purpose of driving the grinding wheel.

The rocker arm 24 is mounted between a pair of pivot bearing plates 26 located congruently, one behind another, as seen in FIGS. 1 to 3. The pivot bearing plates 26 are mounted on the bearing body 14 such that they are pivotable about a first pivot axis C (extending orthogonally to the plane of the drawing in FIGS. 1 to 3) relative to said bearing body 14. The pivotal movement of the pivot bearing plates 26 about the first pivot axis C is illustrated by the dot-and-dash arc D. This pivot arc D describes the movement path of a second pivot axis E which extends parallel to the first pivot axis C, that is to say likewise orthogonally to the plane of the drawing according to FIGS. 1 to 3. The second pivot axis E is that pivot axis about which the rocker arm 24 is pivotable with respect to the pivot bearing plates 26. The dot-and-dash curve F, which is shaped like a segment of a circle, shows the movement (viewed in isolation) of the drive axis B upon a pivotal movement of the rocker arm 24 about the second pivot axis E.

Linear guides $\mathbf{28}_1$ and $\mathbf{28}_2$ are furthermore provided on the bearing body 14 so that a linear movement of the right-hand end of the rocker arm 24 (as seen in FIGS. 1 to 3) can be executed by means of a linear drive device 30, preferably having a ball-and-screw spindle drive. Here, the axis of rotation A moves along the dot-and-dash line G. During such a linear movement of the right-hand end of the rocker arm 24 (as seen in FIGS. 1 to 3), and ultimately the grinding wheel 16, along the line G from the release position (shown in FIG. 1), in which an endless saw blade 32 to be machined is released, into a machining position of maximum stroke (shown in FIG. 3) by way of a central position (shown in FIG. 2), there is a coupled pivotal movement of the rocker arm 24 and the pivot bearing plates 26. Observation of FIGS. 1 to 3 shows that the combination of the linear movement along the line G and the pivotal movement about the first pivot axis C with respect to the bearing body 14, necessitates a deflection of the pivot bearing plates 26 from their position shown in FIG. 1 into the deflected position at an angle β (shown in FIG. 3) by way of the angular position at an angle α (shown in FIG. 2). According to the invention, it is therefore possible to use the linear drive device 30 to displace the rocker arm 24 linearly along the dot-and-dash line G, guided by way of the linear guides $\mathbf{28}_1$ and $\mathbf{28}_2$, during which that end region of the rocker arm 24 which holds the drive motor 18 is pivoted upwards in each case.

It is of particular advantage here that the mass of the drive motor 18 acts as a counter-weight to the mass of the components of the machining device 12 which are mounted on the right-hand end of the rocker arm 24. The mass-induced torque which, with respect to the second pivot axis E, is produced on the left-hand side as seen in the Figures and acts on the rocker arm 24 is slightly greater than the mass-induced torque which, with respect to the second pivot axis E, is produced on the rocker arm 24 on the right-hand side. This means that the resultant torque according to arrow H which, with respect to the second pivot axis E, is produced on the left-hand side as seen in the Figures attempts to pivot the drive motor 18 and, with this, the end region of the rocker arm 24 downwards and thereby to pivot the grinding wheel 16 upwards. In other words the drive device 30 has to effect displacement by applying a driving force in order to move the grinding wheel 16 out of the release position shown in FIG. 1 into the maximum machining position shown in FIG. 3 by way of the central position shown in FIG. 2.

The torques acting on the rocker arm 24 on both sides with respect to the pivot axis E are, for the most part, compensated and the resultant torque H is rated such that only small forces need to be applied by way of the drive device 30 in order to realise a movement out of the position shown in FIG. 1 into the position shown in FIG. 3. If a current no longer passes through the machine 10, for example due to a power failure or to bring about an idle condition, the rocker arm 24 firstly maintains its position under the effect of the resultant torque H and the mechanical resistance, particularly the frictional resistance, of the linear drive 30 and, with a low expenditure of force, can be moved back into the release position shown in FIG. 1, in which the endless saw blade 32 is released.

Further functions and details relating to the construction of the machine 10 according to the invention are illustrated in FIGS. 4 to 7 and described below.

FIG. 4 shows a section along the section line IV—IV in FIG. 1. The construction of the pivot bearing arrangement 34 is shown in particular in FIG. 4. As already described above, this comprises two pivot bearing plates $\mathbf{26}_1$ and $\mathbf{26}_2$ which are mounted by way of a first pivot bearing 36 defining the first pivot axis C such that they are pivotable relative to the bearing body 14. On that end of the pivot bearing plates $\mathbf{26}_1$ and $\mathbf{26}_2$ which is remote from the pivot bearing 36, a further pivot bearing 38 is arranged which defines the second pivot axis E. The rocker arm 24 is mounted such that it is pivotable about the second pivot axis E by way of this second pivot bearing 38.

FIG. 4 furthermore shows that the rocker arm 24 is constructed as a hollow profile, the drive belt 20 extending in the longitudinal direction in the cavity in the rocker arm 24 and being tensioned between the drive-belt pulley 22 shown in FIG. 2 and the drive-belt pulley 54 shown in FIG. 5, which is provided to drive the grinding wheel 16.

FIG. 4 furthermore shows that the bearing body 14 is pivotable about a third pivot axis I according to the double-headed arrow K and, more precisely, about a bearing axis 40 which is connected to the base (not illustrated). The pivotal movement is effected by way of a threaded drive 42 having a threaded spindle 48, which is rotatably drivable by way of a motor 44 (see FIG. 1) and a drive belt 46, and a spindle nut 50 which is guided on said threaded spindle and is connected in articulated manner to the bearing body 14 at 52.

FIG. 5 shows the drive-belt pulley 54 and its coupling with the grinding wheel 16.

The sectional view according to FIG. 6 shows that two linear guides $\mathbf{28}_1$ and $\mathbf{28}_2$ are actually provided for linear guidance along the line G. FIG. 6 again shows the principle of the rocker arm 24, on the one end of which the drive motor 18 is mounted and on the other end of which the grinding wheel 16, or a protective housing partially surrounding this, is provided.

FIG. 7 shows the pivotal movement of the bearing body 14 about the third pivot axis I adapted to the desired geometrical course of the tooth face 58—particularly for machining the cutting angle—of individual teeth 60 of an endless saw blade 62 to be machined, so that the grinding wheel 16 can be inserted with its machining side 64 substantially parallel along the line G with respect to the tooth face 58 of each tooth 60 to be machined. As already described above, the pivotal movement about the third pivot axis I is executed by means of the threaded drive 42, in that the threaded spindle 48 is driven by way of the drive belt 46 starting from the drive motor 44 so that the spindle nut 50 is displaced on the threaded spindle 48 in the direction of the arrow L.

Finally, further reference is made to the fact that the machining device 12 is, to a limited extent, also displaceable along the displacement direction M shown in FIG. 1 in order to position the drive axis A relative to the centre of the endless saw blade 32, as shown in FIG. 1. This enables the machine 10 to be set to different blade thicknesses.

The invention claimed is:

1. A machine (10) for machining long workpieces (32) provided with cutting teeth (60), particularly for grinding endless saw blades, having a machine base (40) and a machining device (12) which has a rotatably drivable tool (16), particularly a grinding wheel, for machining the workpiece (32), the machining device (12) being displaceable relative to the machine base (40) and the workpiece (32), wherein the machining device (12) has a rocker arm (24), on the one end region of which the rotatably drivable tool (16) is arranged wherein the rocker arm (24) is mounted by means of a pivot bearing arrangement (34) which permits a pivotal movement of the rocker arm (24) relative to the machine base (40), which results in the rotatably drivable tool (16) moving linearly relative to the machine base (40) and the workpiece (32), wherein the rotatably drivable tool (16) is linearly displaceable relative to the machine base (40) along a first linear displacement axis (G) by means of a linear drive (28, 30), and wherein the pivot bearing arrangement (34) has at least one pivot bearing plate (261, 262), which is pivotable about a first pivot axis (C) relative to the machine base (40) and on which the rocker arm (24) is mounted such that it is pivotable about a second pivot axis (E) parallel with the first pivot axis (C).

2. The machine (10) according to claim 1, characterised in that the linear drive (28, 30) has a ball-and-screw spindle drive.

3. The machine (10) according to claim 1, characterised in that a linear guide (28), preferably a double linear guide (281, 282), is associated with the linear drive.

4. The machine (10) according to claim 3, characterised in that the linear drive (28, 30) has a ball-and-screw spindle drive.

5. The machine (10) according to claim 1, characterised in that the first and second pivot axis (C, E) each extends substantially orthogonally to the first linear displacement axis (G).

6. The machine (10) according to claim 5, characterised in that the pivot bearing arrangement (34) has two pivot bearing plates (261, 262) which are arranged on both sides of the machining device (12).

7. The machine (10) according to claim 1, characterised in that on the other opposing end region of said rocker arm (24) a rotary drive (18) for rotatably driving the tool (16) is arranged.

8. The machine (10) according to claim 7, characterised in that the pivot bearing arrangement (34) has at least one pivot bearing plate (261, 262), which is pivotable about a first pivot axis (C) relative to the machine base (40) and on which the machining device (12) is mounted such that it is pivotable about a second pivot axis (E) parallel with the first pivot axis (C).

9. The machine (10) according to claim 8, characterised in that the first pivot axis (C) extends above the rocker arm (24) and in that the second pivot axis (E) extends below the rocker ann (24).

10. The machine (10) according to claim 9, characterised in that the second pivot axis (E) is arranged with respect to the rocker arm (24) in such a way that the mass of the rotary drive (18) attempts to pivot the machining device (12) in a direction (H) so that the tool (16) moves away from the workpiece (32).

11. The machine (10) according to claim 7, characterised in that the rotary drive (18) and the tool (16) are coupled in force-transmitting manner by way of a gear arrangement, preferably by way of a belt drive (22, 20, 54).

12. The machine (10) according to claim 8, characterised by a bearing body (14) which is mounted on the machine base (40) such that it is pivotable about a third pivot axis (I), the machining device (12) being mounted on the bearing body (14) such that it is pivotable about the first and second pivot axis (C, E).

13. The machine (10) according to claim 12, characterised in that the third pivot axis (I) extends substantially orthogonally to the first and second pivot axis (C, E) and substantially orthogonally to the first linear movement axis (G).

14. The machine (10) according to claim 13, characterised in that the rotatably drivable tool (16) is displaceable along a second linear displacement axis (M), the second linear displacement axis (M) extending in each case substantially orthogonally to the first linear displacement axis (G) and the third pivot axis (I).

15. The machine (10) according to claim 14, characterised in that the movement along the first linear displacement axis (G) and/or along the second linear displacement axis (M) or/and about the third pivot axis (I) is numerically controlled.

16. The machine (10) according to claim 7, characterised in that the rotary drive has a drive motor (18) which is preferably formed by a frequency-regulated three-phase a.c. motor or an a.c. motor for stabilising the circumferential speed.

* * * * *